United States Patent [19]
Spencer

[11] Patent Number: 5,165,336
[45] Date of Patent: * Nov. 24, 1992

[54] METHOD AND APPARATUS FOR MAKING PRINTED ELASTIC BANDS

[75] Inventor: Richard R. Spencer, Hot Springs, Ark.

[73] Assignee: Alliance Rubber Company, Inc., Hot Springs, Ark.

[*] Notice: The portion of the term of this patent subsequent to Mar. 8, 2005 has been disclaimed.

[21] Appl. No.: 806,306

[22] Filed: Dec. 13, 1991

Related U.S. Application Data

[60] Division of Ser. No. 622,484, Dec. 5, 1990, Pat. No. 5,113,757, which is a division of Ser. No. 467,966, Dec. 5, 1989, abandoned, which is a continuation of Ser. No. 164,668, Mar. 7, 1988, abandoned, which is a continuation-in-part of Ser. No. 817,657, Jan. 10, 1986, Pat. No. 4,729,305.

[51] Int. Cl.[5] .............................................. B41F 17/10
[52] U.S. Cl. ........................................................ 101/35
[58] Field of Search ................. 101/35, 115, 129, 484; 83/365, 371, 19; 318/625

[56] References Cited

U.S. PATENT DOCUMENTS

| | | | |
|---|---|---|---|
| Re. 22,835 | 1/1947 | Foard | 101/115 |
| 1,546,834 | 7/1925 | Hanington | 101/122 X |
| 2,037,254 | 4/1936 | Miller | 101/35 X |
| 2,102,689 | 12/1937 | Fischer | 101/35 X |
| 2,121,022 | 6/1938 | Cornwell | 101/DIG. 29 |
| 2,710,577 | 6/1955 | Prett | 101/124 |
| 2,753,001 | 7/1956 | Page | 83/19 |
| 2,824,610 | 2/1958 | Schubert et al. | 83/100 X |
| 3,146,653 | 9/1964 | Kuts | 83/925 EB |
| 3,313,461 | 4/1967 | Andersen | 226/20 |
| 3,407,690 | 10/1968 | Stanley | 83/371 X |
| 3,527,166 | 9/1970 | Jaffa et al. | 101/126 X |
| 3,679,112 | 7/1972 | Black et al. | 226/19 X |
| 4,263,845 | 4/1981 | Okamura | 101/35 |
| 4,434,562 | 3/1984 | Bubley et al. | 101/424.1 |
| 4,464,615 | 8/1984 | Rodi | 318/625 |
| 4,541,722 | 9/1985 | Jenks | 83/365 X |
| 4,572,686 | 2/1986 | Tanaka | 83/371 X |
| 4,579,027 | 4/1986 | Lewis | 83/925 EB |
| 4,715,846 | 12/1987 | Zak | 493/10 |
| 4,729,305 | 3/1988 | Spencer | 101/122 X |
| 4,781,090 | 11/1988 | Feldkamper et al. | 83/74 |

FOREIGN PATENT DOCUMENTS

| | | | |
|---|---|---|---|
| 2042817 | 8/1970 | Fed. Rep. of Germany | 83/19 |
| 2112710 | 7/1983 | United Kingdom | 101/DIG. 19 |
| 2126169 | 3/1984 | United Kingdom | 101/35 |

*Primary Examiner*—Clifford D. Crowder
*Attorney, Agent, or Firm*—James Creighton Wray

[57] ABSTRACT

Printed elastic bands are made by piercing, evacuating and flattening an elastic tubing and washing and scrubbing and drying the upper surface of the tubing, aligning a tubing on a conveyor and moving the tubing upward toward a printing head and quickly downward away from the printing head while maintaining the tubing flattened. The printing is devolatilized and cured while the tubing continues to move to the cutoff point. Nip rollers drive a tubing onto a cutoff platen, a final roller near the edge of the platen has a higher surface speed than the nip rollers to flatten the tubing. Printing on the tubing is sensed and rotating knives are sensed and the speed of the nip rollers is controlled to cut the tubing between the printed areas. Severed printed bands are removed by vacuum and are discharged from a cyclone separator.

12 Claims, 4 Drawing Sheets

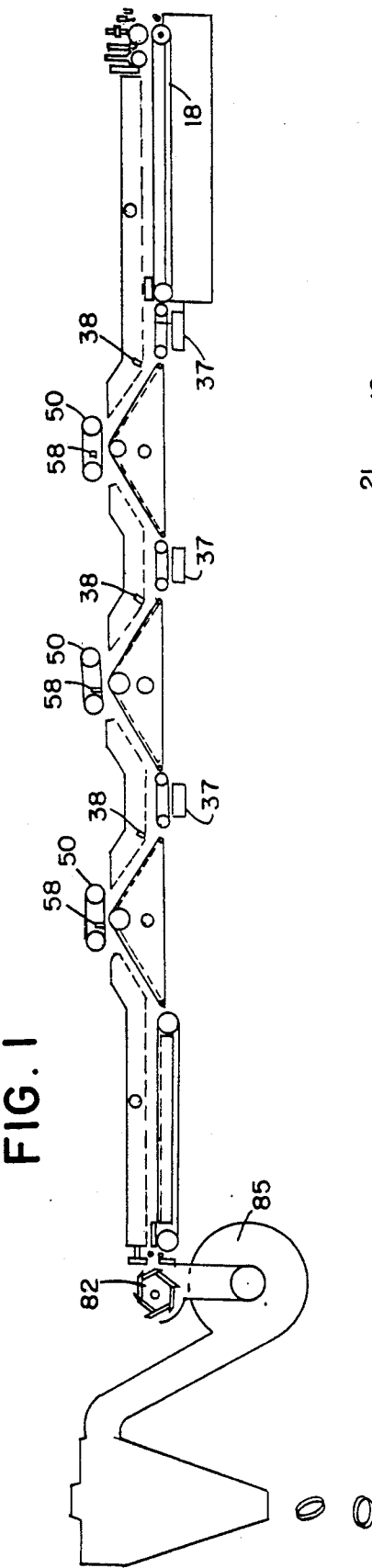
FIG. 1
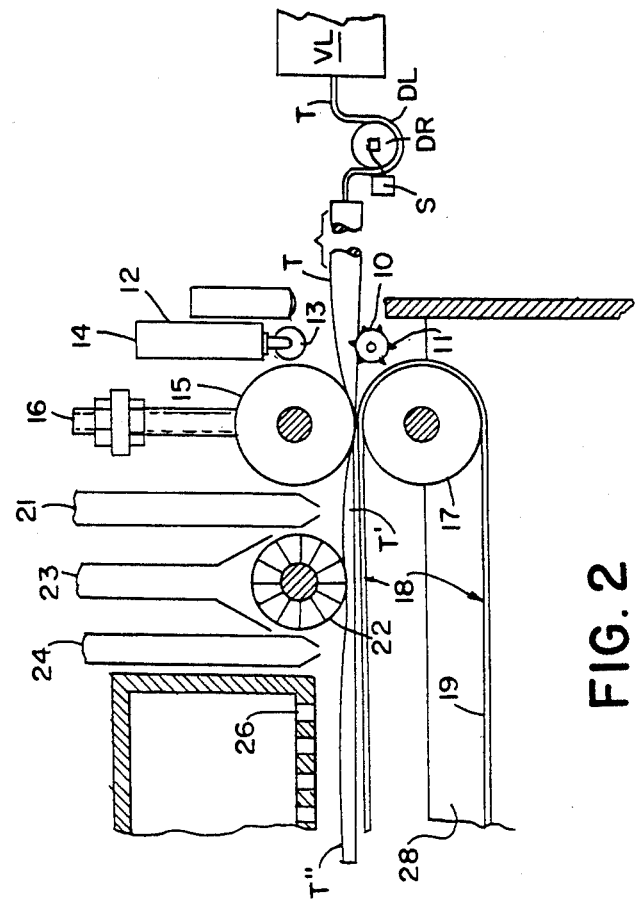
FIG. 2
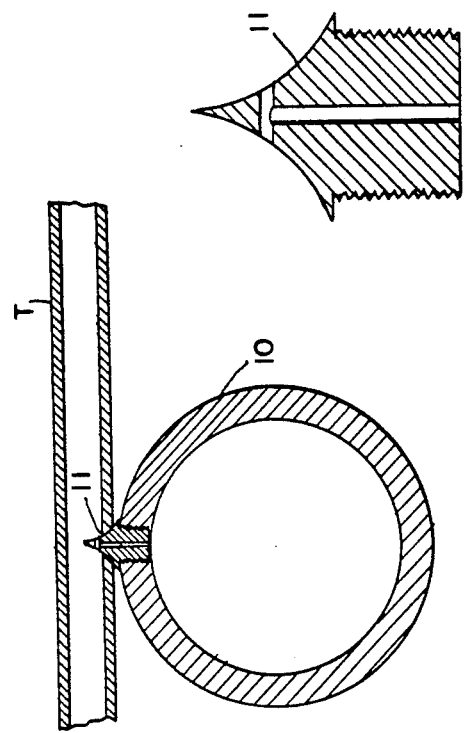
FIG. 7
FIG. 8

METHOD AND APPARATUS FOR MAKING PRINTED ELASTIC BANDS

This application is a division of Ser. No. 07/622,484, filed Dec. 5, 1990, now U.S. Pat. No. 5,113,757, which is a division of Ser. No. 07/467,966, filed Dec. 5, 1989, now abandoned, which is a continuation of Ser. No. 07/164,668, filed Mar. 7, 1988, now abandoned, which is a continuation-in-part of Ser. No. 06/817,657, filed Jan. 10, 1986, now U.S. Pat. No. 4,729,305.

BACKGROUND OF THE INVENTION

This application relates to the manufacture of elastic bands and particularly to printed elastic bands.

Elastic bands may be made according to methods described in U.S. Pat. Nos. 2,781,550 and 3,787,552. Preferably, tubes are extruded and cured and are directly fed into the present apparatus.

One problem of printing rubber bands is that it is difficult to imprint the bands with ink which uniformly attaches to or impregnates the surfaces of the band.

When elastic bands are made by cutting off ends of tubes, it is difficult to cut the tubes at high speed in registry with the printing so that the printing is centered on the band.

In printing rubber bands, it is extremely difficult to print the bands without smearing or otherwise fouling the ink-substrate relationship.

Another problem associated with rubber bands is that it is difficult to direct and guide the tubing so that printing may be precisely positioned on the tubing and so that the ends of the tubing may be cut off at precise positions.

Another problem associated with the manufacture of rubber bands is that it is difficult to flatten the tubing before working with the tubing.

The present invention provides solutions to many of the problems associated with manufacture of printed rubber bands.

SUMMARY OF THE INVENTION

Printed elastic bands are made by piercing, evacuating and flattening an elastic tubing and washing and scrubbing and drying the upper surface of the tubing, aligning a tubing on a conveyor and moving the tubing upward toward a printing head and quickly downward away from the printing head while maintaining the tubing flattened. The printing is devolatilized and cured while the tubing continues to move to the cutoff point. Nip rollers drive a tubing onto a cutoff platen, a final roller near the edge of the platen has a higher surface speed than the nip rollers to flatten the tubing. Printing on the tubing is sensed and rotating knives are sensed and the speed of the nip rollers is controlled to cut the tubing between the printed areas. Severed printed bands are removed by vacuum and are discharged from a cyclone separator.

The preferred method of making printed elastic bands comprises feeding elastic tubing into a perforating apparatus, perforating the tubing, exhausting fluid from within the tubing, flattening the tubing, cleaning the tubing, drying the tubing, continuously conveying the tubing, keeping the tubing flat, aligning the tubing, printing the tubing, aligning the printed tubing, driving the tubing, drying and curing the printed image, and cutting off lengths of the printed tubing into printed elastic bands and removing the printed elastic bands.

The preferred perforating comprises feeding the tubing over a roller with generally radially directed spikes, and piercing a lower surface of tubing.

Preferably, the spikes and roller are hollow and are connected to a vacuum source.

The preferred method of perforating further comprises sensing inflation of the incoming tubing and pushing the tubing down on the spiked roller and piercing the upper surface of the tubing with the spikes upon sensing excessive inflation.

Preferably, the pushing comprises pushing a roller downward against the upper surface of the tubing.

The preferred exhausting draws the tubing through a constricting device, which is a pair of rollers.

In the preferred cleaning fluid is sprayed from a jet onto an upper surface of the tubing.

Hot water and detergent or steam under high pressure may be used on the upper surface of the tubing.

The upper surface of the tubing is buffed with a rotating brush.

Preferably one rotates the brush at a speed greater than tangential speed of the tubing moving beneath the brush.

The preferred cleaning further comprises spraying rinsing fluid on the upper surface of the tubing.

The conveying of the tubing preferably comprises transporting the tubing on a movable open mesh belt conveyor.

It is useful to evacuate a chamber beneath the open mesh belt.

The preferred drying step comprises blowing drying gas on an upper surface of the tubing and removing the drying gas through the open mesh belt into the evacuated chamber below the open mesh belt and thereby concurrently flattening the tubing on the open mesh conveyor.

The aligning includes generally centering the flattened tubing as it moves from the open mesh conveyor belt.

Preferably, the aligning further comprises transferring the cleaned and dried tubing to a turnable conveyor having a surface of flexible belts.

The flexible belts are stretched as the turnable conveyor is turned.

In the preferred method the positioning comprises turning the flattened tubing toward and away from a printer before and after printing the tubing. Preferably, the turning comprises lifting the tubing from a horizontal conveyor with a sloped conveyor, turning the tubing downward with the sloped conveyor adjacent the printing head and conveying the tubing downward with the sloped conveyor.

The lifting, turning and moving the tubing downward with a sloped conveyor comprise carrying the belt on a generally triangularly shaped open mesh conveyor and evacuating a space beneath the open mesh conveyor while blowing fluid down against an upper surface of the tubing on the open mesh conveyor for flattening the tubing adjacent the printing head and for drying the tubing.

The preferred printing comprises "kiss" printing of an image upon the upper surface of the tubing by a movable screen.

Preferably, the printing comprises screening the image on the upper surface of the tubing by moving an endless screen at the same speed as the tubing and forcing printing material through the endless screen onto the upper surface of the tubing.

One preferred alternative printing comprises moving a screen into contact with the cleaned upper surface of the tubing, moving the screen along the tubing and forcing printing material through the screen while moving the screen.

Preferably, the flattening of the printed tubing on the downward slope of the conveyor further comprises flowing volatalizing and curing fluid against the upper surface of the printed tubing and through the open mesh conveyor belt.

Additionally, a roller is turned above the tubing beyond the downward turning of the tubing for feeding a leading end of the tubing downward.

Heating the upper surface of the tubing is used for devolatilizing and curing after the printing.

The cutting includes sensing the printing on the upper surface of the tubing and sensing the knifeblade edges, and the driving comprises accelerating, maintaining speed or decelerating the tubing according to the sensing.

One preferably accelerates, maintains speed or decelerates the tubing between cutting steps, so that this continuous adjustment of the speed of the motor helps to cause cuts to be accurately spaced between printed images The preferred removing of the cut off elastic bands comprises conveying the elastic bands with reduced pressure.

One preferably separates the elastic bands from the removal with a cyclone separator or a screen type divertor or cage or other methods.

A preferred method of printing elastic bands comprises collapsing an elastic tubing, keeping the tubing collapsed throughout, cleaning the upper surface of the tubing from ink-adhesion inhibitors, accurately aligning the tubing for properly centered printing, firmly positioning the tubing for receiving images, creating impression transfer locations on the tubing for distortion-free imaging, printing images on the tubing, devolatilizing and curing the printed images, precisely cutting the tubing between the images at high speed and discharging the finished product comprising elastic bands with precisely positioned printed images.

Preferred apparatus for manufacturing printed elastic bands comprises collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatilizing and curing ink images printed on the tubing, high speed cutting means for cutting ends of the tubing between printed images and discharging means for discharging the finished product. Any means capable of performing the functions may be used.

The preferred collapsing means comprises a roller studded with needle spikes which pierce the bottom of the tubing and a pair of rollers above and below the tubing following the studded roller for constricting the tubing to collapsed form by forcing internal fluid from the tubing through the pierced wall of the tubing.

The preferred collapsing means further comprises sensing means for sensing proximity of an upper wall of the tubing to the sensing means and descending roller means positioned above the tubing and means for descending the roller means on the tubing when the proximity sensor senses proximity of the upper surface of the tubing for driving the upper surface of the tubing downward on the needle spikes on the studded roller to pierce the upper surface of the tubing as well as the lower surface of the tubing.

First open mesh conveyor means is positioned beneath the lower surface of the tubing and extending from a proximal position near the collapsing means and cleaning means to a distal position removed from the cleaning means. First evacuating means is positioned beneath the open mesh conveyor for holding the tubing down on the open mesh conveyor and for drawing fluids around the tubing, and further comprises blower means mounted above the tubing keeps the tubing collapsed by blowing fluid downward on an upper surface of the tubing adjacent the first open mesh conveyor.

The cleaning means includes a first cleaning jet extending across an upper surface of the tubing for delivering cleaning fluid under pressure to an upper surface of the tubing, scrubbing means above the upper surface of the tubing for contacting the upper surface of the tubing and for scrubbing the upper surface of the tubing following the spraying of cleaning fluid on the tubing and a rinsing jet extending across the tubing after the scrubbing means for rinsing fluid from the tubing and through the open mesh first conveyor.

The first open mesh conveyor is sufficiently long to provide drying of the tubing.

The preferred aligning means comprises a pivotable aligning conveyor positioned at the distal end of the first open mesh conveyor.

In a preferred embodiment, the pivotal aligning conveyor comprises a first grooved roll having an axis positioned near the distal end of the first open mesh conveyor and a second grooved roll having a movable axis mounted on a pivot which is spaced from the first and second axis and which is transverse to the first and second axis. Plural elastomeric belts are mounted in the grooves of the first and second rollers. Edge sensing means are positioned near the distal end of the aligning conveyor for sensing edges of the tubing. Moving means are connected to the aligning conveyor for turning the second axis around the pivot in response to the edge sensing means.

The preferred positioning means is a triangularly shaped open mesh conveyor positioned adjacent the aligning means for receiving the tubing from the aligning means and for lifting the tubing into contact with the printing means and for turning the tubing downward and moving the tubing quickly away from the printing means. The triangular conveyor has an evacuation chamber beneath the conveyor for drawing fluid through the conveyor. Blower means positioned above the conveyor force fluid downward on the tubing for holding the tubing flat on the triangular conveyor.

A preferred printing means comprises a screen and means for moving the screen in contact with the tubing and means for flowing ink through the screen onto areas of the tubing.

Preferably, the screen is a continuous screen mounted on rollers above the tubing, and the screen moves concurrently with the tubing.

In one form the screen is mounted on a frame and means lift the frame and lower the frame into contact with the tubing and move the screen along the tubing.

The preferred devolatilizing and curing means comprise a final open mesh conveyor, a final evacuating chamber beneath the final open mesh conveyor and means above the final conveyor for directing the fluid current downward on the conveyor to flatten the tubing on the conveyor and to devolatilize and cure the ink.

The preferred cutting means comprises blades mounted on a roller having an axis perpendicular to the direction of movement of the tubing and further comprising nip rollers positioned above and below the tubing for pinching and driving the tubing. A final roll is positioned above a cutoff platen at the end of the tubing. The final roll is driven faster than the nip roll. Printing sensing means positioned above the printed tubing between the top nip rolls and final roll sense printing on the tubing. Blade sensing means mounted adjacent the blades sense position of the blades. Driving means connected to the nip rolls accelerate, maintain speed or decelerate the tubing according to the printing sensor and to output of the blade position sensor which is a resolver or absolute encoder.

The preferred discharging means comprises an evacuated chamber beneath the roller which mounts the blades and a cyclone separator connected to the evacuated chamber for drawing cut off elastic bands from the evacuated chamber and for separating air from the rubber bands remote from the evacuated chamber.

This invention provides apparatus cutting off printed elastic bands from a printed elastic tubing comprise nip rollers engaging upper and lower surfaces of the printed tubing, synchronous drive means connected to the nip rollers for driving the nip rollers, a platen positioned beneath a distal end of the tubing and a large roller having knives oriented transversely to the tubing for moving the knives near a distal edge of the platen and cutting off elastic bands. A final roller is positioned above the platen near the distal end. Drive means connected to the final roller and to the nip rollers drive a surface of the final roller faster than a surface of the nip rollers. The final roller slips on the upper surface for drawing forward, for ensuring flatness of the tubing at the cutting. Print sensing means positioned above the tubing between the nip rollers and the final roller senses printing on the tubing, and absolute encoder blade sensing means positioned adjacent the blades senses position of the blades. Coordinating means connected to the printing sensing means and to the blade sensing means and to the drive accelerates, maintains speed or decelerates the tubing according to the sensings.

The invention provides a printing apparatus for printing elastic tubing prior to cutting the tubing into printed elastic bands comprising a printer, a conveyor having three rolls mounted on triangularly arranged axes, one axis being near the printer for moving the tubing toward a printer and for directing tubing away from the printer after it has been printed.

Preferably, an open mesh belt extends around the rollers. An evacuated chamber is positioned beneath the open mesh belt. A pressure source above the open mesh belt flows fluid downward on the tubing and flattens the tubing on the belt before and after printing.

These and further and other objects and features of the invention are apparent in the above and ongoing specification, which includes the claims and the drawings.

BRIEF DESCRIPTION OF THE DRAWINGS

FIG. 1 is a schematic representation of producing printed elastic bands from elastic tubing showing plural printing stations.

FIG. 2 is a detail of perforating, washing and conveying the tubing.

FIG. 7 is a detail of perforating spikes.

FIG. 8 is a detail of perforating roller and spikes.

DETAILED DESCRIPTION OF THE DRAWINGS

Figure 3:
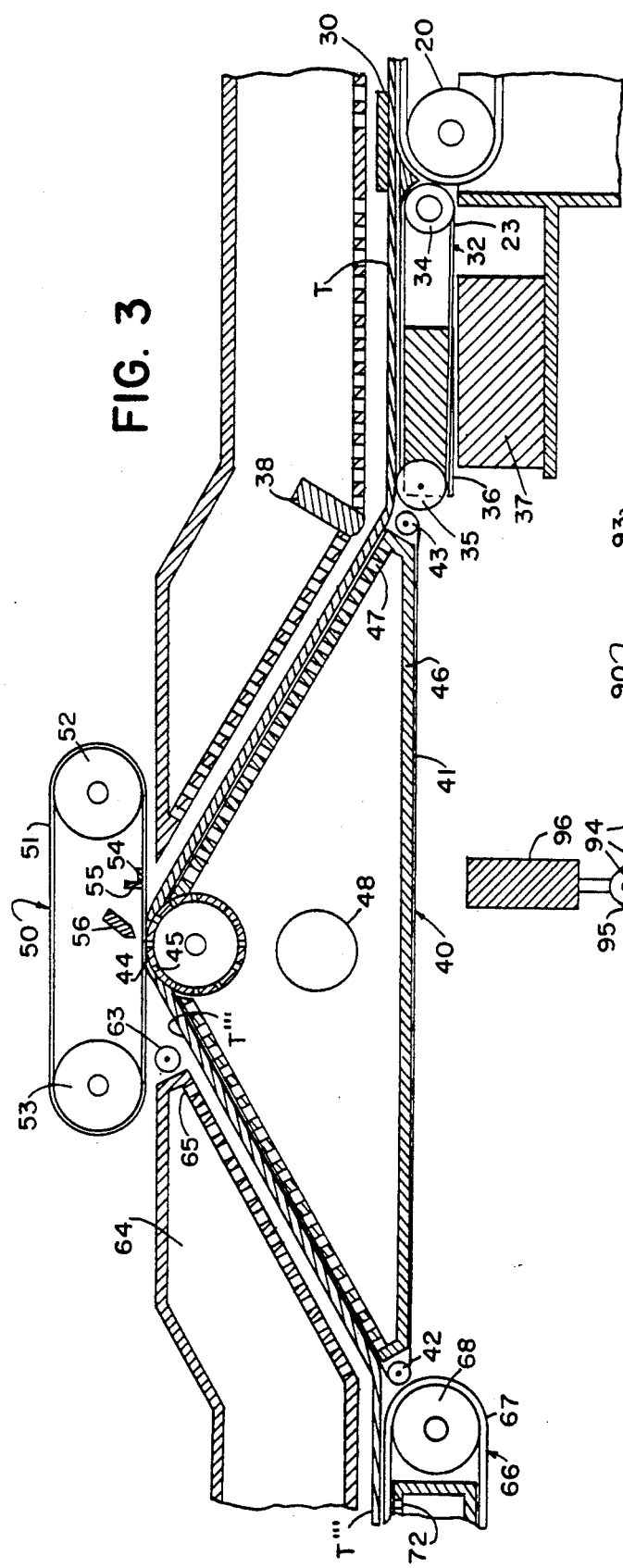
FIG. 3 is a detail of aligning, flattening, raising, lowering, printing, redirecting, devolatilizing and curing.

FIG. 1 gives an overall view of this unique system which collapses the elastic tubing, keeps it collapsed throughout the system, cleans the upper surface from ink-adhesion inhibitors, accurately aligns the tubing for properly centered printing, firmly positions the tubing for receiving the image, creates impression transfer location for distortion-free imaging, provides image ink devolatilizing and curing, precisely cuts between-the-images a high-speed, and efficiently discharges the finished product. This unique system is self threading and is automatically aligning for minimal attendance by operating personnel.

This is a unique method of manufacturing printed rubber bands from thin-walled elastic tubing which has been formed and vulcanized in circular form by methods such as those described in U.S. Pat. No. 781,550 and 3,787,552.

In FIG. 2, the elastic tubing T is drawn over roller 10 that is studded with needle spikes 11, which pierce the bottom of the tubing T. This allows the release of fluid (commonly air) trapped inside the tubing T. When the quantity of trapped fluid becomes excessive, the tubing T expands until the sensor 12, a photoelectric, sonic, or capacitive proximity sensor, triggers the roller 13 to descend upon the tubing T driving the spikes 11 through both the underside and the upperside of the tubing T. This provides dual (upperside and underside) paths to release the internal fluid pressure from the tubing T, and thereby continuously provides uniform collapsing of the tubing T. Linear actuator 14, an electric solenoid or a pneumatic or hydraulic cylinder, retracts roller 13 when tube T is sufficiently deflated, as sensed by sensor 12. The lanced tubing is referred to as T'. The tubing T' is drawn through a constricting device consisting of a pair of rolls 15 and 17 selectively relatively positioned, as by the adjustment screw 16, so that the tubing T' is initially constricted to collapsed form with no internal fluid as it is drawn into the system. The tubing T' is transported on conveyor 18, the endless open-mesh conveyor belt 19 on the pair of rolls 17 and 20 which are driven by a servo motor.

The length of conveyor 18 is predicated by the desired manufacturing rate, which may be commensurate with the speed of the tubing manufacturing method, the chemical composition of the elastic tubing, and the drying rate of the gas directed through jets 26 toward the tubing.

Tubing T' in collapsed form passes under fluid jet 21, which sprays a cleaning fluid, preferably hot water and detergent or steam, under high pressure upon the upper surface of Tubing T' to begin the cleaning process. The tubing T' then passes under rotating brush 22 which buffs the upper surface of the tubing T', removing all contaminants, such as stearic acid, wax, sulphur, salt crystals, and oxides, which could inhibit ink adhesion later. The rotating brush 22 spins in the same direction as roller 15 but at a higher rate, to provide sufficient buffing action. The brush 22 continuously is purged of contaminants by suction hood 23, which is attached to a high-pressure exhaust blower intake, thereby drawing air over the brush to vacuum away the contaminants. The tubing T' then passes under fluid jet 24 which sprays a rinsing fluid (commonly clean water) upon the buffed surface of the tubing T' to complete the cleaning. The rinsing fluid flows off the tubing T', through the open-mesh conveyor belt 19, and into catch basin 28 positioned under the whole length of open-mesh belt 19. The rinse waste then is discharged through drain port 29. The cleaned tubing is referred to as tubing T''. The clean tubing T'' passes under the drying gas hood 25, which directs the drying gas, preferably hot air, through openings 26, which are slotted or perforated holes, against the upper surface of tubing T''. The drying gas removes any remaining fluid from the cleaned tubing T''' surface as it is conveyed and maintains the tubing T'' in collapsed form. The drying gas enters the drying gas hood 25 through inlet 27 under pressure from the generation source.

In FIG. 3, the tubing T'' being conveyed on open-mesh belt 19 is aligned by "V"-guides 30 toward the center of the conveyor 18. The "V"-guides 30 are mounted on support 31, which also transitionally supports the tubing T'' as it leaves the open-mesh belt 19 and as the tubing T'' is deposited at the center of automatic alignment conveyor 32. Variations in the width of the elastic tubing T'' limits the effective centering alignment ability of the stationary "V"-guides 30. The automatic alignment conveyor 32 is therefore essential for precision final alignment of the elastic tubing T'' approaching conveyor 40 where the ink image will be applied. The automatic alignment conveyor 32 is the group of elastic endless conveyor belts 33 supported by rolls 34 and 35. Rolls 34 and 35 have recessed surface grooves sufficiently deep to keep the endless belts 33 separated and running parallel to each other. Roll 34 is driven by a servo motor so that the surface of belt 33 moves simultaneously with the surface of belt 36. The alignment sensor 38, which is preferably a line sensor camera with adjacent light source 38, photoelectric, pneumatic reflective, sonic, or capacitive proximity sensor, controls the side-to-side motion 39 of the yoke 36 and roll 35 by servo mechanism 37. As the tubing T'' passes under sensor 38, the tubing T'' is precisely automatically aligned on the conveyor 40. The elastic tubing T'' has the tendency to move sideways during conveyance and must be precisely aligned on conveyor 40 for accurate printing. Sideways movement of the tubing may be due to the nature of the rubberlike tube product and its extruding and curing. The flattened width dimension of elastic tubing manufactured with a high content of natural rubber tends to fluctuate, thereby necessitating frequent tedious inspection during processing. This task is solved by the line sensor camera 38 with interface circuitry in the microprocessor of controller 60 continually measuring the flattened width of tubing T''. Controller 60 compares this actual width measurement of tubing T'' with the permissible limits for the flattened width of the tubing T'' entered by the operator into controller 60. When the monitored measurement exceeds the permissible limits, controller 60 activates solenoid 57, lifting printing head 50 from the tubing T'' and notifies the operator by a synthesized voice announcement through speaker 60'. The operator then has the options of instructing controller 60 to: return the impermissible width tubing T'' to the apparatus's entrance adjacent roller 10 for replacement with permissible width tubing T; permit the unprinted impermissible width tubing to be cut and discharged separately by a command signal 83'' from controller 60 to a container changer (not shown) at the cyclone discharge 88, or halt the apparatus in order for the operator to manually remove the portion of impermissible width tubing T''. When sensor 38 detects tubing T'' with permissible width measurement dimensions, controller 6 deactivates solenoid 57 returning print head 50 to printing position on the permissible width tubing T''.

Conveyor 40 is an open-mesh endless belt 41 supported by rollers 42, 43, and 44 in a triangular arrangement to give conveyor 40 a pitched center atop roller 44. Rollers 44, 43, and 42 are driven by a servo motor so that the surface of belt 41 moves simultaneously with the surfaces of belts 33 and 19. Roll 44 has openings 45 (slots or perforations) and the triangular vacuum hood 46 has openings 47 (slots or perforations), which draw the underside of tubing T'' stationary against open-mesh belt 41 during conveyance. The vacuum hood is evacuated through port 48 which is connected to the intake of a vacuum generator, a blower or vacuum pump intake. The drying gas emitted from the drying gas hood 25 keeps the upper surface of the tubing T'' pressed down thereby maintaining the collapsed form of tubing T'' as well as keeping the tubing stationarily aligned on belt 41 in preparation for printing.

A printing head 50 applies the ink image to the upper surface of the collapsed tubing T'' as it is conveyed by belt 41 over the top of roller 44. The ingress and egress of the tubing T'' must be at sufficient angles created by conveyor 40 so as to minimize the tangential contact between the printing head 50 and the tubing T'' surface. Excessive contact by conventional means, such as flat conveyors or rollers which are not self-threading, cause image registration difficulties (double images, blurred lines, smearing, and ink thickness inconsistencies). The upper surface of elastic tubing T'' must be stressed evenly and must be positioned firmly while maintaining its collapsed form as the image ink is applied. The angles of ingress and egress give instant image transfer (kiss printing) at the (nip) tangent point of printing head 50 with the upper surface of elastic tubing T''. FIG. 3 illustrates a printing head 50 as one of many types of satisfactory printing heads which may be used with this manufacturing method. The printing 50 is an endless belt printing screen 51, which has been image masked and which is supported by rolls 52 and 53. The rolls 52 and 53 are driven by a servo motor so that the surface of belt 51 moves simultaneously with the surface of belt 41 for accurate printing registration. The ink 54, an elastomeric polymer or dye stain, is distributed on the masked screen belt 51 by spreader blade 55. The ink flows through the image mask in the screen belt 51 as the elastomeric squeegee 56 presses the belt 51 against the upper surface of tubing T''. Thus, ink is deposited accurately on the tubing T'' surface.

Figure 6:
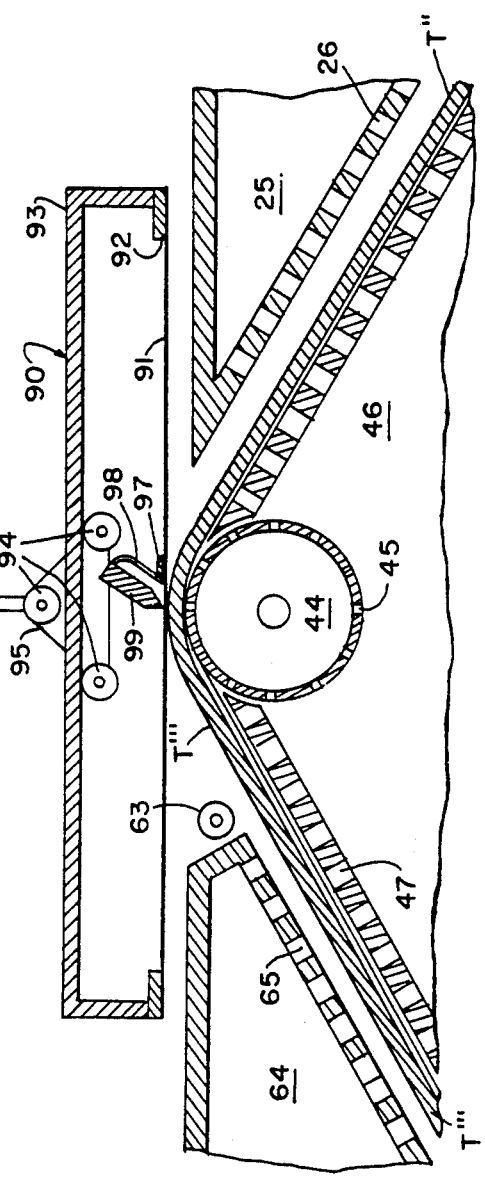
FIG. 6 is a detail of alternate printing.
Figure 5:
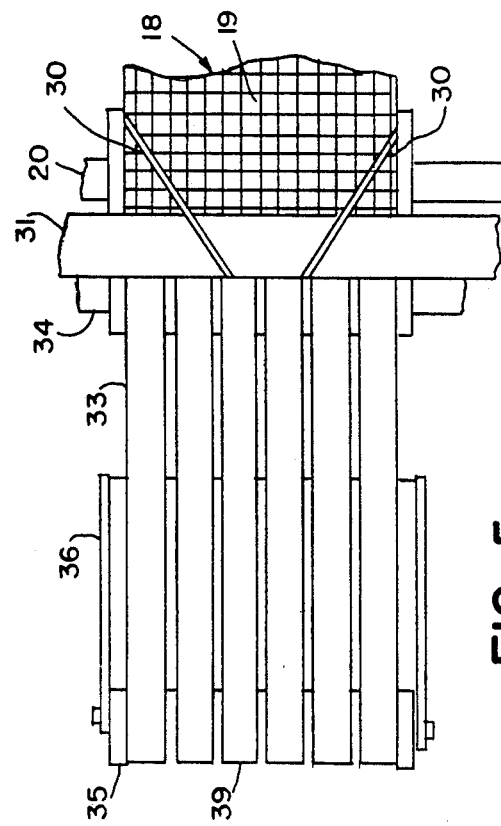
FIG. 5 is a detail of the aligning.

FIG. 6 illustrates an alternative reciprocating-screen intermittent-motion flat bed screen printer head 90. The image masked screen 91 is supported by frame 92 and is mounted on a reciprocating yoke 93. The yoke is driven forward and backward by a triangular cluster of rolls 94 mounted in bracket 95. The linear actuator, an electric solenoid or a pneumatic or hydraulic cylinder, 96 lowers the bracket 95 until the screen 91 touches the upper surface of tubing T'' at the beginning of a printing cycle. A servo motor drives the rolls 94 supporting yoke 93 forward simultaneously with the movement of the tubing T''. The ink 97 is distributed over the image masked screen 91 by spreader blade 98. The ink 97 flows through as the squeegee 99 presses the screen 91 to the tubing T''. Once the forward printing stroke is complete, the linear actuator 96 lifts the screen 91 from the tubing T'', the servo motor driving rolls 94 retract the yoke 93 to the maximum opposite direction, and then the linear actuator 96 lowers the screen 91 back to the tubing T'' upper surface. During the retraction stroke, the tubing T'' may be stopped by the conveyor servo motors, awaiting the next forward printing stroke.

Alternately, the printing head 50 may be a standard rotary screen drum, flexographic drum, offset flexographic drum, letterpress drum, or gravure drum. Because the thickness of the elastic tubing T'' varies, these alternatives must be either counter-balanced or automatically pressure (nip gap) adjusted by an integral sensor (photoelectric, sonic, capacitive proximity, load cell, or torque sensor) to provide continuous precision contact pressure with upper surface of the elastic tubing T''. Alternately, the printing head 50 may be an ink-jet dot-matrix printer, or laser (light beam) marking imager, in which case, the conveyor 40 servo motor would move the tubing T'' continuously or in intermittent-motion as described in the previous paragraph. After printing the tubing is referred to as printed tubing T'''.

Elastomeric polymer ink 54 occasionally coagulates in tiny lumps before passing through the screen belt 51 and can thereby plug the open imaging areas of the belt's screen mask. To monitor cleanliness of the open image area of the screen mask, a line sensor camera 58 is mounted on a position adjustable screw 59 adjacent the squeegee 56 (or squeegee 99 in FIG. 6) inside printing head 50. A small light source 58' is mounted beneath screen belt 51. As belt 51 passes between the lens of line sensor camera 58 and the light source 58', the openings in the image mask of screen belt 51 appear light to the scan of sensor 58 in contrast to the remainder of the masked screen belt 51. Sensor 58 outputs to the microprocessor of controller 60 signals for each lighted pixel (picture element) of the open area of the image mask. The surface movement of belt 51 is communicated to controller 60 by the resolver 50'' of print head 50 servo motor 50'. Controller 60 triggers the line scan camera 58 to scan the belt 51 a particular number of times related to the displacement of the belt. Accordingly the scanning and belt speed are interrelated. Controller 60 periodically compares the average pixel count of the mask images to the optimum number (entered by the operator into controller 60) of pixels that should be detected on each mask image scanned. When controller 60 determines a shortage in the scanned mask image pixel count, it notifies the operator by synthesized voice announcement through speaker 60' that the screen mask is plugging. The operator then wipes belt 51 with a solvent cleaner while the apparatus continues to operate, or halts the apparatus to replace belt 51 with a clean belt. The sensor 58 detects each mask image and also serves as a timing element in the registration control of the multi-color printing method later described.

Roll 63, driven clockwise by a conventional motor, acts as a fail-safe jam avoider, by deflecting any initial ends of printed tubing T''' under the gas curing hood 64. This only occurs the moment the end of a section of tubing T''' initially egresses from the printing head's nip point. Once the tubing T''' is under the hood 64, there is no contact between roll 63 and the tubing T'''.

Curing gas, preferably hot air, enters the curing gas hood 64 under pressure from the generation source through inlet port 62 and is directed through openings 65 (slots or perforations) against the freshly printed surface of tubing T'''. The curing gas removes volatiles from the ink base and begins the ink curing process. Also mounted in the curing gas hood 64 structure and directed toward the printing tubing T''' may be curing acceleration devices such as infrared or ultraviolet light, electron beam, or microwave energy sources. Such devices are predicated upon the curing chemistry of the ink used for the printed images.

The tubing T''' is then transported on conveyor 66. The endless open-mesh conveyor belt 67 is supported by the pair of rolls 68 and 69 which are driven by a servo motor. Thus, the movement of belt 66 is simultaneous with the movement of belts 41, 33, and 19. Within the cavity inside conveyor 66 is a vacuum hood 70 which is connected to a vacuum source via port 71. The tubing T''' is held against the open-mesh belt 67 via the vacuum pull through the openings 72 (slots or perforations) in the vacuum hood 70. This coupled with the downward force by curing gas emitting from the curing gas hood 64 prevents the tubing T''' from slipping sideways during the drying or curing of the ink.

Figure 4:
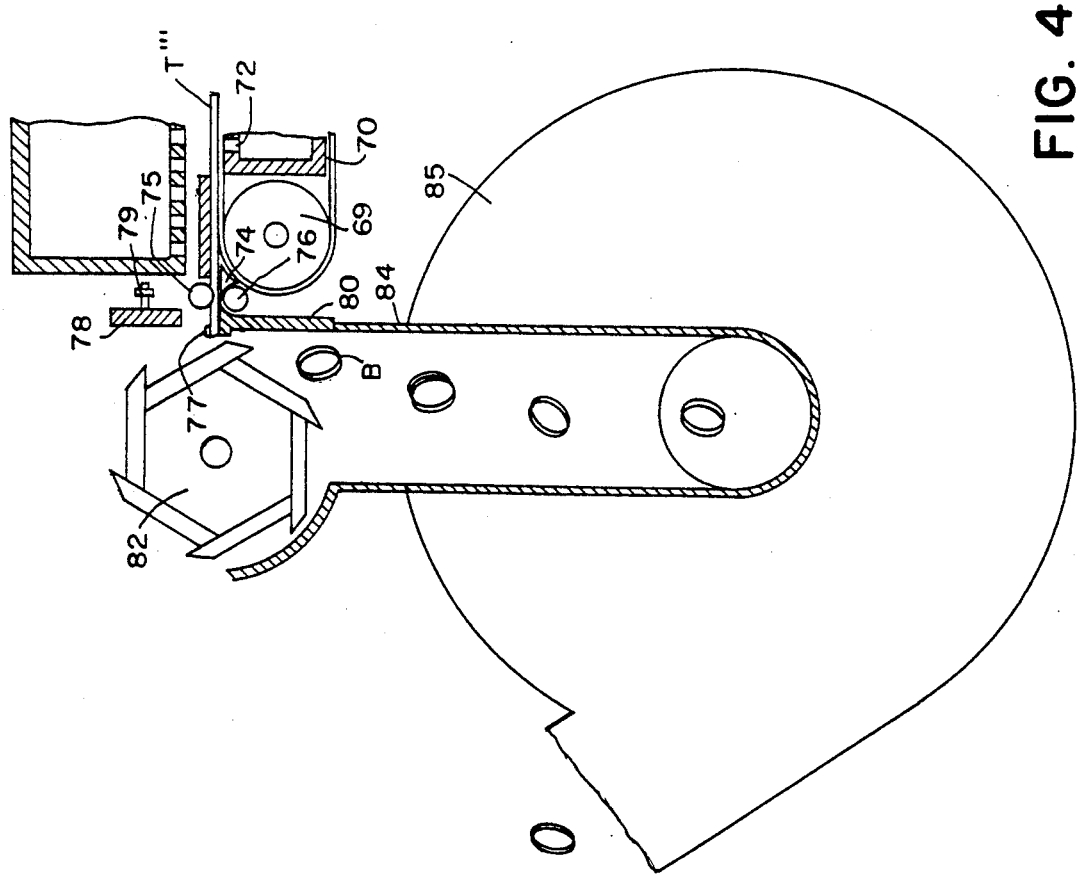
FIG. 4 is a detail of cutting and removing bands.

In FIG. 4, the tubing T''', which has a cured ink image printed on the upper surface, is aligned by "V"-guides 73 toward the center of the conveyor 66. The "V"-guides are mounted on support 74 which also transitionally supports the tubing T''' as it leaves the open-mesh conveyor 66 and enters the constricting device (nip-rolls) formed by rolls 75 and 76. These nip-rolls provide positive, accurate control of the tubing T''' as it enters the cutting stage, and are driven by a servo motor. The final roll 77 is driven by a servo motor with the nip-rolls but spins at least twice the surface speed of the nip-rolls so that tubing T''' is as collapsed as possible between the nip-rolls and the final roll 77.

The sensor 78, which is preferably a line sensor camera with adjacent light source 78''', or alternatively a retroreflective photoelectric or laser scanner, in combination with the sensor 83, controls the nip-rolls' 75, servo motor 76' by controller 60 to position tubing T''' for accurate cutting between the images printed on tubing T'''. The fly knives 81 mounted on hub 82 and driven by a servo motor 82', which is preferably a synchronous type for consistent accurate speed shear against the bed knife 80 in a scissor-type cutting action, slicing the rubber bands B individually from tubing T'''. The rotary cutting head may have removable fly knives 81 or may have the cutting edges milled integral to hub 82 as a solid rotary cutting head. There may be 1 to 32 (or more) fly knives 81 or similarly milled cutting edges on hub 82. Sensor 78 is positionally adjustable by screw 79 to provide accurate sensing location between rolls 75 and 77 for controlling the nip-rolls' 75, 76 forward motions.

Sensor 83, an absolute digital encoder coupled to the drive shaft of hub 82 through motor 82', has a resolution of at least 1 part in 4096, producing a unique output signal for each hub 82 drive shaft position. Thus, sensor 83 provides a definitive output signal to controller 60 the moment each fly knife 81 completes slicing a rubber band B from tubing T''', as well as signalling the rotational speed of hub 82. Sensor 78 detects the presence of the next image on tubing T''' and signals the nip rolls, 75,76 servo motor differential controller to accelerate, maintain speed or decelerate appropriately so that the next cut will be accurately spaced between the printed images on tubing T'''. The rotary cutting head 82 servo motor 82' is speed adjustable to provide the desired overall production rate, which may be commensurate with the speed of the elastic tubing manufacturing method. The power amplifier or frequency controller 82'' powering servo motor 82' may be varied by the operator manually, by a photoelectric, ultrasonic, or electromechanical tension (droop loop) sensor monitoring the tension of the tubing T approaching roller 10 from the tubing source, or by control signal from the apparatus manufacturing or unwinding tubing T for this apparatus.

The nip-rollers' 75, 76 servo motor 76' is, in essence, slave to the speed of the cutting head 82' as it must accurately position additional tubing T''' in preparation for the next cut within the time interval between slices of the cutting head knives 81. The servo motors 66', 40', 32', 18', 50' of conveyors 66, 40, 32, 18 and printing head 50 move simultaneously with the servo motor 76' of nip rolls 75, 76. The servo motor resolvers 76'', 66'', 50'', 40'', 32'', 22'', 18'' provide feedback signals to controller 60 in order that all linear surface movements of rollers 75, 76 conveyors 66, 40, 32, 18, and printing head 50 are equal, and that the surface speed of brush 22 is proportionately greater than that of conveyor belt 18. If the printing head is an intermittent motion type, such as 90 illustrated in FIG. 6, the nip rolls 75, 76 and conveyors 66, 40, 32, 18 are motionless during the non-printing time between printing strokes so the tubing T''' is not moved between prints.

The speed of nip-rollers 75, 76 servo motor 76' is initially determined according to the nominal cut length of rubber band B entered by the operator into controller 60 which calculates the necessary speed in ratio to the rotational speed signal from sensor 83 and drives servo motor 76' accordingly. Controller 60 then continually compares the timing of the signal from sensor 83 which indicates that a cutting edge of fly knives 81 has just completed slicing a rubber band B from T''' to the timing of the signal from sensor 78 which detects the arrival of the next printed image, and appropriately accelerates, maintains speed, or decelerates the speed of servo motor 76' in order that the next cut will be accurately spaced between the printed images on tubing T'''.

Sensor 78 not only scans the printed image on tubing T''' to detect the moment an image on tubing T''' arrives under its line scan, but it also outputs signals representing each pixel (picture element) of image detected under sensor 78's line scan. Controller 60, relative to the movement of nip rolls 75, 76 as signalled by servo motor resolver 76'', counts the pixels received for each printed image scanned. The average count of pixels per image is compared by controller 60 to an optimum number of pixels entered into controller 60 by the operator. When the pixel count average for a period of time is less than the optimum number, thus indicating a deficiency of ink 54 reaching the tubing T''', controller 60 incrementally increases the nominal speed of the ink metering pump 55' (or proportional flow valve if ink 54 is fed from a pressurized vessel) provided that sensor 58 has not detected any plugging of the screen belt 51. When the pixel count exceeds the optimum number, indicating excessive ink 54 on the screen belt 51, controller 60 incrementally decreases the speed of the ink metering pump 55'. Whenever controller 60 changes the speed of the ink metering pump 55', controller 60 notifies the operator by syntehsized voice announcement in order that the operator may monitor the effect of the change to be certain there is no other cause of the printed image defect.

As Lewis points out in U.S. Pat. No. 4,579,027: with rubber bands which have a high degree of elastomeric compounds, the cutting process also often bonds or welds the opposite sides of the band together. To eliminate this problem without complex mechanical means, a mist sprayer 61 is mounted above final roll 77 discharging a fluid mixture, commonly air with liquid lubricant mixture of water and glycerin or mild saline solution, toward the cutting edge of the fly knives 81 and the point where the fly knives 81 shear against the bed knife 80. Mist lubrication thus applied penetrates the open end of the tubing T''' immediately before cutting into rubber bands B. The penetrating lubrication prohibits any bonding during the cutting process. The fluid mixture is fed to the sprayer 61 through a solenoid valve 61' only when nip rolls 75, 76 are in motion, in order to prevent any build-up of unnecessary lubricant in the shearing area. Sensor 78 is equipped with an integral air jet lens cleaning ring to deflect away stray lubricating mist which could interfere with the accuracy of sensor 78 as it scans the printed images on tubing T''' appearing between rollers 75 and 77.

Rotary cutting has the problem that, at high speeds, rubber bands B have the tendency to cling due to the vacuum around the spinning head to the head under the knives 81, be carried back over the top of the head back into the cutting area and become chopped to particles. The problem is eliminated by the pneumatic blower 85 with a material-handling fan wheel which instantly vacuums the rubber bands B away from the fly knives 81 the instant they are cut from T''' and are drawn down conduit 84 into the blower 85. The blower 85 discharges the rubber bands B' through conduit 86 into cyclone separator 87. The air exhausts through top port 89 while the rubber bands B'' are discharged at the cyclone 87 bottom port 88. Thus, the discharge may be mounted elsewhere in the factory, such as over storage containers or packaging equipment for efficient material handling.

Also, traces of the lubricant applied by mist sprayer 61 have thus been evaporated during the vacuum handling and cyclone separation, leaving the rubber bands B'' dry at ambient temperature ready for packaging or other use.

Alternatively, the elastic bands may be removed from the vacuum removal equipment by screen diverters or screen cages or any other means. The majority of rubber bands are packaged by weight and the customer must rely upon an estimated number of rubber bands per unit weight. Variations in the raw materials or manufacturing process often adversely affect the actual number per unit weight, frequently to the customer's dissatisfaction. Controller 60 also counts the number of complete printed images detected on tubing T''' by sensor 78 which were cut as detected by sensor 83 after nip rolls 75, 76 movement was signaled by resolver 76''.

Once a predetermined count entered by the operator into controller 60 has been achieved, controller 60 signals any further processing apparatus 83', such as an automatic packaging machine or bulk container handling device, to cycle at the appropriate moment having received the last of the counted rubber bands B" from the separator 87. Thus, the packages produced upon signal from controller 60 contain accurate numbers of rubber bands B" per package insuring maximum customer satisfaction.

Referring to FIGS. 7 and 8, a preferred tubing exhausting or deflating device comprises a hollow roller 10' with hollow spikes 11' with passageways 11".

A reduced pressure in hollow roller 10 exhausts fluid from the inside of tubing T to collapse and flatten the tubing. When the upper push-down roller 13 is used points 11''' of spikes 11' puncture the upper surface of the tubing.

It is useful to place double-stick tape inside the leading edge of the tubing to keep the leading edge closed and flat and to keep the tube sealed as the leading edge passes through the equipment.

With the addition of one or more printing stations as detailed in FIG. 3 (consisting of a sensor 38, automatic alignment conveyor 32, conveyor 40, printing head 50 with sensor 58, drying gas hood 64, and conveyor 66 of sufficient length to partially set each layer of elastomeric ink 54) installed subsequent to the first printing station and prior to the separating station as detailed in FIG. 4, multi-color printed images with quality registration are produced on rubber bands B. Sensor 38 of the first printing station monitors the flattened width measurement of the tubing T' and edge aligns the tubing T' for accurately centered printing of the image portion having the highest color contrast to the tubing T' color. Sensor 38 of each subsequent printing station detects the arrival moment of the printed images at the respective station as well as provides the signals to center the tubing T'''' on the respective station's alignment conveyor. Controller 60 raises the print head 50 of the respective subsequent station by activating solenoid 57, determines the difference in timing between the detected printed image arrival signal of sensor 38 and the detected mask image arrival signal of sensor 58, momentarily slows the servo motor 50' until the mask image is synchronized with the arriving previously printed images, and deactivates solenoid 57 setting printing head 50 in contact with tubing T'''' printing the subsequent image layer of elastomeric ink 54. Thusly arranging three or more print stations in series (each printing sequel colors with color-keyed half-tone image masks), full-color in-register printed elastic bands B are produced at high speed production rates. Arranging multiple printing stations in series also enables an apparatus operator who is printing single color bands B to service or change the screen belt 51 on a printing head 50 while alternate heads keep the apparatus at full output. This is an important economic advantage for elastic band manufacturers utilizing continuous tubing manufacturing techniques such as detailed in U.S. Pat. No. 3,787,552 for maximum utilization of the apparatus.

Figure 9:
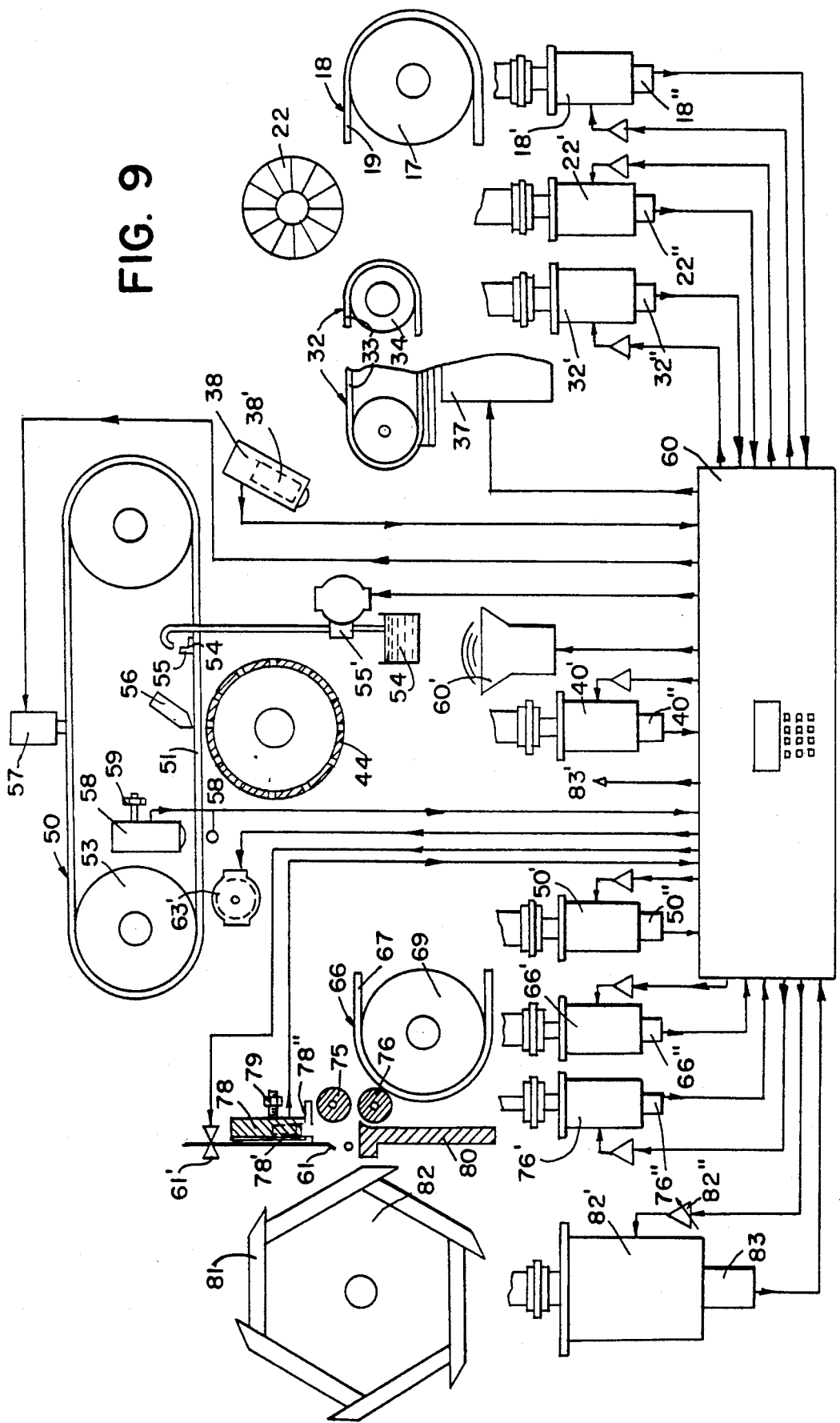
FIG. 9 is a schematic representation of electronic sensing, signalling and controlling using controller 60.

In the preferred embodiment of the invention as shown in FIG. 9, the conveyor 18 comprises in part a continuous belt around a drive roller 17. An alignment conveyor 32 has a belt 33 driven by a roller 34. The entire conveyor 32 is movable about a pivot on a fixture 37 as shown in FIG. 3. The alignment sensor 38, which is a line sensor camera 58 with a light source 38', senses the width of the belt as well as the alignment and sends signals to the processor 60. The printing device 50 has a continuous screen 51 driven by rollers 53. Ink 54 from a reservoir is pumped with a pump and valve 55' controlled by the processor 60. The ink 54 is spread on the belt by a blade 55. Squeegee 56 drives the ink through the belt into contact with the tubing on the conveyor which passes around suctioning drive roller 44. A solenoid lifts 57 lifts the printing head out of printing contact with the tubing whenever the sensor 38 senses an inappropriate belt size. Light source 58' shines through the screen 51 after ink has been driven through the screen by the squeegee. Any occlusion sensed by line sensor camera 58 indicates a clotting of ink which is reported to processor 60 in the form of information on the number of illuminated pixels. Processor 60 then causes speaker 60' to indicate the need for cleaning the screen. Major clotting sensed by sensor 58 or incorrect size tubing sensed by sensor 38 may cause command signal 83' to stop the machines.

As shown in the drawing, a command from processor 60 may cause the initiating roller 63' to move downward into contact with a leading edge to force the tubing downward to promote direct threading or attitude of the tubing. Final conveyor 66 has a drive roller 69 which drives belt 67 into pinch rollers 75 and 76 which advance the belt leaving conveyor 66. Final roller 77 aids in holding the tubing on anvil 80 to provide square cuts. A lubricating system 61 as controlled by computer control valve 61' sprays anti-welding mist lubrication on the tubing as it is cut by sharp chisel edges of blades 81 moving closely to anvil 80. As described in the drawings, motor 18' drives roller 17 which drives conveyor 18. Motor 22' drives brush 22, and motor 32' drives the roller which drives aligning conveyor 32. Motor 40' drives the suction drive roller 44. Motor 50' drives roller 53 which moves continuous screen 51. Motor 66' drives the roller which moves conveyor belt 66 in a counterclockwise direction. Motor 76' drives the pinch rollers 76 and 75. Motor 82' drives the roller 82 on which blades 81 are mounted.

18" and 22", 32", 40", 50", 66", 76" and 83 are angular acceleration or rotation sensors which also may indicate positional information, especially in the case of sensor 83.

Amplifiers indicated by open triangles are positioned in the control circuits leading from the processor to the synchronous motors. 82" represents a variable amplifier for speed control of motor 82'. Sensing inputs are indicated by arrows pointing toward the processor 60 and control outputs are indicated by arrows leading away from the processor 60. The processor is the center of all controls of the process aided by sensors. The processor allows the system to operate at maximum effective speed with only minor uniform variations as may be required by the nature of the product being manufactured and the raw material used.

Setting speed of the system simply requires selecting a speed within variable control 82''', Processor 60 then controls the remainder of the controllers to provide correct speed of the other servo motors. Speeds of the other motors are maintained constant or are increased or decreased to coordinate feed of the tubing for proper alignment of the printing sensed by scanner 78, with position of knives, sensed by resolver 83.

As shown in FIG. 2 the tube manufacturing vulcanizer VL produces the tubing T. A dancer roll and a droop loop moves upward or downward according to relative tubing speeds from the vulcanizer and into the perforator 10. As tubing from the vulcanizer speeds up, sensor S notes the position of the droop loop or dancer roll DR, and controls amplifier 82" for synchronous motor 82' to speed up the motor.

While the invention has been described with reference to specific embodiments, modifications and variations of the invention may be constructed without departing from the scope of the invention. The scope of the invention is defined in the following claims.

What I claim is:

1. The method of making printed elastic bands comprising feeding an elastic tubing into a perforating apparatus, perforating the tubing, exhausting fluid from within the tubing, flattening the tubing, cleaning the tubing, drying the tubing, continuously conveying the tubing, keeping the tubing flat, aligning the tubing, printing the tubing, aligning the printed tubing, driving the tubing, drying and curing the printed image, and cutting off lengths of the printed tubing into printed elastic bands and removing the printed elastic bands, wherein the steps of feeding, perforating, exhausting, flattening, cleaning, conveying, printing, driving and cutting further comprise operating synchronous type servo motors to perform the steps and further comprise coordinating the motors with a processor.

2. The method of claim 1 wherein the coordinating comprises continuously adjusting speed of the motor for performing the cutting step.

3. The method of claim 1 further comprising sensing printed image on the tubing before cutting off lengths of the printed tubing with a line sensor camera.

4. The method of claim 1 further comprising sensing printed image on the tubing before the cutting step and sensing the cutting motor position and coordinating the cutting motor position with the sensed printed image on the tubing.

5. The method of claim 1 further comprising sensing tubing condition by illuminating the tubing and sensing a transverse line of reflected light on the tubing with a line sensor camera.

6. The method of claim 5 further comprising communicating to the processor a value of number of illuminated pixels in the line sensor camera.

7. Apparatus for manufacturing printed elastic bands comprising collapsing means for collapsing an elastic tubing, flattening means for maintaining the tubing flattened throughout the apparatus, cleaning means for cleaning an upper surface of the tubing for removing ink-adhesion inhibitors, aligning means for aligning the tubing for properly centered printing, positioning means for positioning the tubing for receiving printed images, printing means for printing images on the tubing, devolatilizing and curing means for devolatizing and curing ink images printed on the tubing, high speed cutting means for cutting ends of the tubing between printed images and discharging means for discharging the finished products as printed elastic bands, wherein the collapsing means, flattening means, cleaning means, printing means and cutting means comprise synchronized servo motors connected to the means for driving the means and further comprising control means connected to the motors for controlling speeds of the motors and processor means connected to the controls for interrelating speeds of the motors.

8. The apparatus of claim 7 further comprising sensing means mounted adjacent the tubing and light means mounted adjacent the tubing for shining light on the tubing, the sensing means comprising line sensor camera means for sensing a line of light across the tubing, the sensing means being connected to the processor means for providing information to the processor means in response to a line of light sensed on the tubing.

9. The apparatus of claim 7 wherein the printing means comprises plural printing stations for printing images on the tubing.

10. The apparatus of claim 9 wherein the printing stations comprise means for printing different colors in the same image.

11. The apparatus of claim 9 wherein the printing stations comprise interchangeable means for printing images.

12. The apparatus of claim 9 wherein the plural printing stations comprise plural stencil means for stencilling images and further comprise stencil position sensor means for sensing position of the stencils.

* * * * *